March 14, 1961

J. FAURE HERMAN 2,974,923

EQUIPMENT FOR DISTRIBUTING FLUID AND
VALVE FOR OPERATING THE SAME

Filed Dec. 16, 1958

March 14, 1961                J. FAURE HERMAN                2,974,923
              EQUIPMENT FOR DISTRIBUTING FLUID AND
                   VALVE FOR OPERATING THE SAME
Filed Dec. 16, 1958                                    2 Sheets-Sheet 2

United States Patent Office 2,974,923
Patented Mar. 14, 1961

2,974,923

EQUIPMENT FOR DISTRIBUTING FLUID AND VALVE FOR OPERATING THE SAME

Jean Faure Herman, 68 Rue de l'Est, Boulogne-sur-Seine, France

Filed Dec. 16, 1958, Ser. No. 780,708

Claims priority, application France Dec. 26, 1957

4 Claims. (Cl. 251—137)

The invention relates to valves and more particularly to electrically operated valves used in pipe lines.

Valves generally have a certain amount of inertia to overcome in passing from one operating position to the other, this inertia being relatively small when the control of the valve is provided by a control motor, and greater when the return of the valve in its second position is provided by a free recoil member, such as a spring.

On this account, if one of the positions of the valve is obtained almost instantaneously, the other position, is obtained somewhat slowly.

One of the purposes of the invention is to obviate these disadvantages.

Another purpose of the invention is to obtain a valve reacting instantaneously to the control that opens and closes said valve.

Another purpose of the invention is to control the valve electrically.

The invention also applies to the characteristics hereinafter mentioned and to their various possible combinations.

A valve according to the invention is shown by way of example in the attached drawings, in which.

Figure 1:
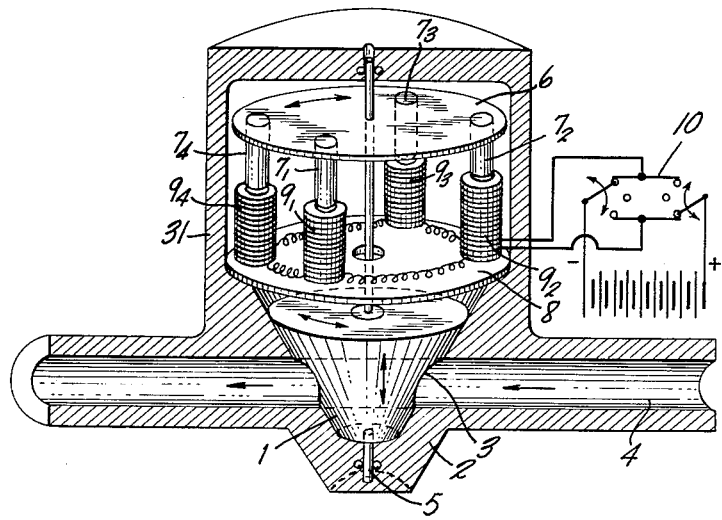
Figure 1 shows a valve in sectional perspective.

The revolving valve shown in Figure 1, consists of a rotary plug 1, preferably cone-shaped, that is able to revolve in its valve seat 2. The "open" position corresponds to the alignment of the passage 3 with the conduit 4. The "closed" position is obtained by rotating the rotary plug 1 for a quarter-turn around its spindle 5, so as to bring the passage 3 into a direction perpendicular to that of the conduit 4. The spindle 5 integral with the rotary plug 1, carries a soft iron plate 6 at its upper part, on whose periphery permanent magnets $7_1$, $7_2$, $7_3$, $7_4$ are arranged, with alternately opposite polarity. The rotary plug 1, the spindle 5, the plate 6 and the magnets 7 are integral with each other and form the moving part 30. This moving part 30 can move slightly upwards detaching the rotary plug 1 from its valve seat 2, and also, revolve on its spindle 5. Another soft iron plate 8 is fixed to the body 31 of the valve. It carries electro-magnets $9_1$, $9_2$, $9_3$, $9_4$, on its periphery, electrically connected to a current reverser 10 by means of which the electromagnets can be energized, deenergized and reenergized in reverse polarity.

The spindles of the electro-magnets 9 and the permanent magnets 7 are not in extension of each other, but are slightly offset in a manner that will be subsequently explained.

The valve described above operates in the following manner (Figures 2 to 7).

Figure 2:
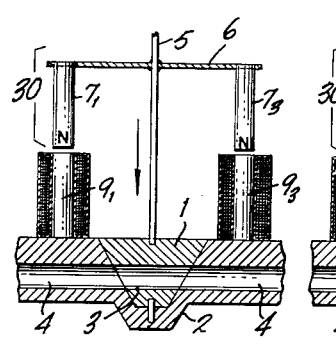
Figures 2, 3, 4, 5, 6 and 7 show respectively, cross section views in pairs in elevation and plane, of diagrams showing the various stages of the working of the valve.
Figure 3:
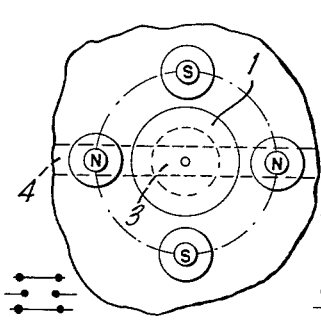

In Figures 2 and 3, the valve is in the "open" position.

The current reverser 10 being in the deenergizing position, no current passes into the coils of the electro-magnets 9. The permanent magnets 7 are attracted by the soft iron cores of the electro-magnets 9 which are appreciably facing them.

The moving part 30 is thus impelled downwards and the rotary plug 1 is applied to its valve seat 2 under the influence of the magnetic attraction of the permanent magnets for the iron cores of the electro-magnets. The opening 3 is in line with the conduit 4 enabling the fluid to flow.

Figure 4:
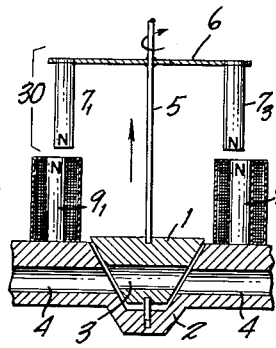
Figure 5:
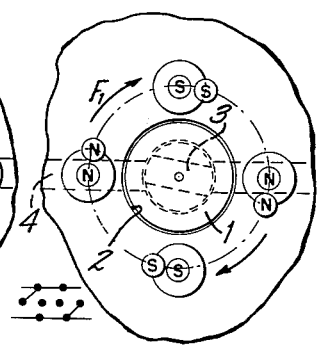

Figures 4 and 5 show in cross-section elevation and plane, a diagram of the valve during the change from the "open" to the "closed" positions.

The current reverser 10 sends the current into the coils of the electro-magnets 9 so as to produce polarities similar to those of the permanent magnets 7, i.e., that the electro-magnet $9_1$ has a north pole opposite to the north pole of the magnet $7_1$, the electro-magnet $9_2$ has a south pole opposite to the south pole of the magnet $7_2$ and so on.

The moving part 30 is thus repelled upwards unseating the rotary plug 1 from its valve seat 2 by the opposing poles of similar polarity and rotated a quarter turn by the attraction of the adjacent poles of opposite polarity thus bringing the rotary plug to the "closed" position.

After this rotation, the relative positions of the magnets 7 and the electro-magnets 9, are those of Figures 4 and 5 i.e., magnets 7 and 9 having their respective poles of opposite polarity substantially opposed so that during and at the end of this rotation in the direction of the arrow $F_1$ (Figure 7), the repulsion from bottom to top is transformed into an attraction downwards of the rotary plug 1 which returns to its valve seat.

Figure 6:
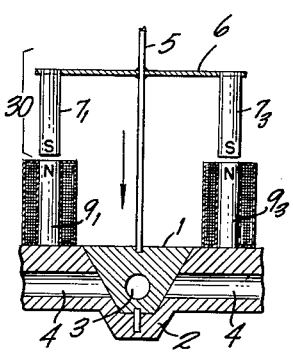
Figure 7:
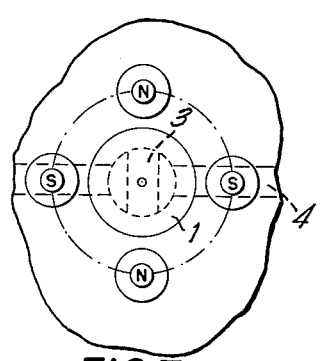

Figures 6 and 7 show the valve in the "closed" position.

The current reverser 10 is returned to the deenergizing position. No current passes into the coils of the electro-magnets 9. The attraction downwards continues, however, because of the action of the permanent magnets on the soft iron cores of the electro-magnets 9. The rotary plug 1 is again applied to its valve seat 2, closing the laminary leak temporarily produced by raising the rotary plug 1 off its valve seat 2.

By reenergizing the electromagnets in the reverse direction with current reverser 10, the rotary plug is rotated back to the "open" position.

Figure 8:
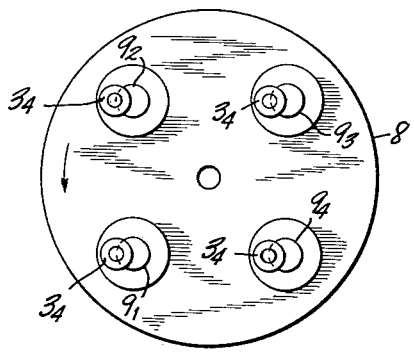
Figure 8 shows the electro-magnets displacing coils.

The starting of the rotation of the moving part 30 in one direction or the other, can be aided by means of a conducting coil 34 (Figure 8) wound around a longitudinal element of the cores of the electro-magnets 9. A certain amount of dephasing is thus caused during the initial energizing of the electro-magnets.

Figure 9:
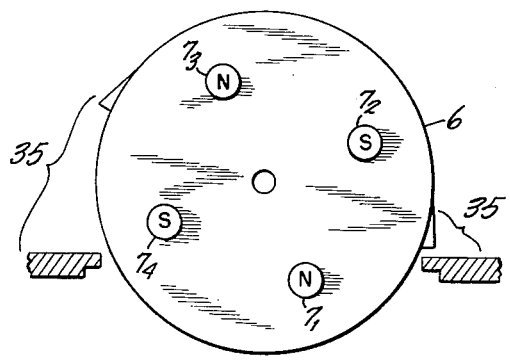
Figure 9 shows the support plate of the magnets with its abutment device.

A similar starting assistance can be achieved by providing an abutment 35 (Figure 9) which would stop the rotation of the permanent magnets 7 a little before alignment with the cores of the electro-magnets 9, as already mentioned.

The valve described above possesses numerous advantages, and more particularly the following ones:

(1) The three movements of the rotary plug 1: raising, rotating and lowering on its valve seat 2 are obtained by the single combination of permanent magnets 7 and electro-magnets 9 from a single operation of a current reverser 10 passing from a deenergizing to an energizing position.

(2) The control takes place by sending a current so that when the valve is placed in the required position, it remains there without consuming electric current.

(3) The unit is of relatively small size and does not occupy much space, even in the case of metering considerable flow of liquid or gaseous fluids circulating under high pressure.

What I claim is:

1. An electrically operated valve having an open and a closed position comprising a valve body, a conduit in said body for the flow of fluid through said body, a valve seat defined across said conduit, a rotary plug adapted to fit said valve seat and interrupt said conduit, said valve plug being mounted for rotation about an axis normal to said conduit and for linear movement along said axis, said rotary plug being traversed by a passage normal to said axis of rotation and congruent with said conduit in said open position and normal to said conduit in said closed position, permanent magnet means mounted to rotate and move linearly with said rotary plug, said permanent magnet means axially spaced from said rotary plug and conduit and symmetrically arranged around and parallel to said axis of rotation with adjoining poles having opposite polarity extending toward said rotary plug, electromagnet means having permeable magnetic cores mounted stationary in said valve body intermediate said rotary plug and said permanent magnet means and extending toward and parallel to said permanent magnet means, means for energizing the electromagnet means with alternately opposite polarities similar to the polarities of the opposed permanent magnet means for repelling said permanent magnet means and thereby raising said rotary plug linearly from its seat, the adjoining permanent magnet means of opposite polarity being attracted by the adjacent opposite polarities of the opposed electromagnet means to rotate to align said adjacent poles, thereby rotating said rotary plug and passage to open position, and said opposite poles of said electromagnet means attracting said permanent magnet means linearly to reseat said rotary plug in its valve seat in said open position, means for deenergizing said electromagnet means to leave the permeable magnetic cores attracted by said permanent magnet means thereby holding said rotary plug firmly seated in said valve seat after said deenergization, and means for reversing the polarities of said electromagnets to rotate said rotary plug in the reverse direction in a similar manner back to the closed valve position.

2. An electrically operated valve as described in claim 1 characterized in that said permanent and electromagnet means are equal in number and are equally spaced around said axis of rotation of said rotary plug to rotate said plug for closing the ends of said traverse passage in said rotary plug by said valve seat.

3. An electrically operated valve as described in claim 1 characterized in that a closed inductive winding is placed around said permeable core of each said electromagnet means for causing a dephasing of the magnetism between said magnet means whereby the permanent and electromagnetic means are just out of alignment in said open and closed positions to facilitate starting rotation.

4. An electrically operated valve as described in claim 1 characterized in that an abutment limits the rotation of said permanent magnet means to displace alignment of magnetic means and thereby facilitate starting rotation.

References Cited in the file of this patent
UNITED STATES PATENTS
2,569,800     Cataldo _____ Oct. 2, 1951
FOREIGN PATENTS
398,331     France _____ Mar. 20, 1909